(12) United States Patent
Boone, Jr. et al.

(10) Patent No.: US 6,367,648 B1
(45) Date of Patent: Apr. 9, 2002

(54) WATER TANK FOR USE ON A FIRE TRUCK

(75) Inventors: Joseph E. Boone, Jr., 540 Morse Landing Dr., Cicero, IN (US) 46034; Alfred L. Finley, 2201 Hidden Creek, Ft. Worth, TX (US) 76107; Douglas B. Kelley, Frankton, IN (US)

(73) Assignees: Joseph E. Boone, Jr.; Alfred L. Finley, both of Fairmount, IN (US)

( * ) Notice: Subject to any disclaimer, the term of this patent is extended or adjusted under 35 U.S.C. 154(b) by 0 days.

(21) Appl. No.: 09/524,663

(22) Filed: Mar. 13, 2000

(51) Int. Cl.[7] ................................................. B65D 5/00
(52) U.S. Cl. ..................... 220/563; 220/567.2; 220/590
(58) Field of Search ................................ 220/563, 564, 220/567.2, 590; 137/574, 576

(56) References Cited

U.S. PATENT DOCUMENTS

| 1,394,742 | A | * | 10/1921 | Kramer | .................. | 220/563 X |
| 1,462,347 | A | * | 7/1923 | Kramer | ...................... | 220/563 |
| 2,056,820 | A | * | 10/1936 | Bradley et al. | ............. | 220/563 |
| 3,187,766 | A | * | 6/1965 | Black | ...................... | 220/563 X |
| 4,775,070 | A | * | 10/1988 | Williams | .................... | 220/563 |
| 4,927,050 | A | * | 5/1990 | Palazzo | ................ | 220/567.2 X |
| 5,772,938 | A | * | 6/1998 | Sharp | ...................... | 220/590 X |

* cited by examiner

Primary Examiner—Steven Pollard
(74) Attorney, Agent, or Firm—Taylor & Aust, P.C.

(57) ABSTRACT

A tank contains a liquid while being transported by a moving vehicle. The tank includes a shell having an annular wall interconnecting opposite longitudinal end walls. The annular wall and the end walls define an interior compartment. The shell also has a substantially horizontal length direction and a substantially horizontal width direction perpendicular to the length direction. Two substantially planar longitudinal baffles are disposed within the interior compartment of the shell. Each longitudinal baffle is oriented substantially vertically and substantially parallel to the length direction of the shell. Each longitudinal baffle has a first side facing the annular wall. Each longitudinal baffle also has a second side. The second sides face each other. A plurality of substantially planar latitudinal baffles are disposed within the interior compartment of the shell. Each latitudinal baffle is oriented substantially vertically and substantially parallel to the width direction of the shell. First ones of the latitudinal baffles are each disposed between a first side of a corresponding longitudinal baffle and the annular wall. Second ones of the latitudinal baffles are disposed between the second sides of the two longitudinal baffles. The second latitudinal baffles are substantially staggered relative to the first latitudinal baffles along the length direction of the shell.

14 Claims, 3 Drawing Sheets

WATER TANK FOR USE ON A FIRE TRUCK

BACKGROUND OF THE INVENTION

1. Field of the Invention

The present invention relates to tanks for holding a liquid, and, more particularly, to a liquid-containing tank that is carried by a truck and a method of manufacturing the same.

2. Description of the Related Art

Tanks for carrying a liquid on the back of a truck are well known. Such tanks carry a wide variety of liquids, such as gasoline, chemicals and water. A problem is that the liquid within the tank acquires momentum as it is transported by the truck, and when the truck accelerates or decelerates, the inertia of the liquid causes it to slosh against the front end or the rear end of the tank. The forces associated with this sloshing, as well as the resulting change in the center of gravity of the truck, may cause the truck to become destabilized. Such destabilization may cause the driver to lose control of the truck, or may even cause the truck to overturn. This problem is especially acute in the case of fire trucks, which are required to carry a tank of water to a fire as quickly as possible. In order to lower the center of gravity, and thereby increase the stability of the truck, it is known to form the tank with an elliptical cross section, with the longer cross width of the ellipse extending in the horizontal direction.

Another problem is that the force exerted by the sloshing of the liquid within the tank can adversely affect the structural integrity of the tank. In order to withstand these forces, it is known to form the tanks of a heavy metal material and/or with especially thick outside walls. This increases both the cost and weight of the tank.

It is known to place concave baffles in a tank which extend across the entire width of the tank. The intent of the concave baffles is to break the total water volume into smaller volumes that individually create less surge force when the tank is accelerated or decelerated. A problem is that since all of the water within a compartment collides with a same baffle and rebounds in an opposite direction, the resultant force of such collision is still very high, and may lead to instability of the truck. Also, after the water rebounds off of the baffle, it then collides again with another baffle or a tank wall, thereby causing more instability. Further, because of the concave shape, the baffles are difficult to manufacture and install.

It is known to manufacture such liquid-containing tanks by separately forming a bottom half and a top half of the tank. The two halves are then bolted and welded together. The problem is that the process of bolting and welding is labor intensive and therefore expensive. Also, leaks may form between the two halves of the tank.

What is needed in the art is a liquid-containing tank which can reduce the forces associated with the liquid sloshing against the inner walls of the tanks, while at the same time having greater structural integrity. What is also needed is a method of producing such a tank which is efficient and results in a lessened probability of leakage.

SUMMARY OF THE INVENTION

The present invention provides a water tank having staggered internal baffles which cause the water within the tank to swirl between the baffles when the tank is accelerated or decelerated. The baffles also serve to increase the structural strength of the tank. Further provided is an efficient method of producing such a tank.

The invention comprises, in one form thereof, a tank containing a liquid while being transported by a moving vehicle. The tank includes a shell having an annular wall interconnecting opposite longitudinal end walls. The annular wall and the end walls define an interior compartment. The shell also has a substantially horizontal length direction and a substantially horizontal width direction perpendicular to the length direction. Two substantially planar longitudinal baffles are disposed within the interior compartment of the shell. Each longitudinal baffle is oriented substantially vertically and substantially parallel to the length direction of the shell. Each longitudinal baffle has a first side facing the annular wall. Each longitudinal baffle also has a second side. The second sides face each other. A plurality of substantially planar latitudinal baffles are disposed within the interior compartment of the shell. Each latitudinal baffle is oriented substantially vertically and substantially parallel to the width direction of the shell. First ones of the latitudinal baffles are each disposed between a first side of a corresponding longitudinal baffle and the annular wall. Second ones of the latitudinal baffles are disposed between the second sides of the two longitudinal baffles. The second latitudinal baffles are substantially staggered relative to the first latitudinal baffles along the length direction of the shell.

An advantage of the present invention is that, when the tank is accelerated or decelerated, the baffles guide the water within the tank to swirl from side to side and in vertical directions as the water's inertia causes it to flow along the length of the tank. This side to side and vertical dispersion of the water greatly reduces the surge forces exerted on the walls of the tank, and on the truck that carries the tank.

Another advantage is that the baffles increase the structural strength of the tank, thereby allowing the walls of the tank to be formed of a thinner and lighter material.

Yet another advantage is that the tank can be manufactured with a minimum amount of labor, and in such a way that the possibility of leakage is greatly reduced.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Figure 1:
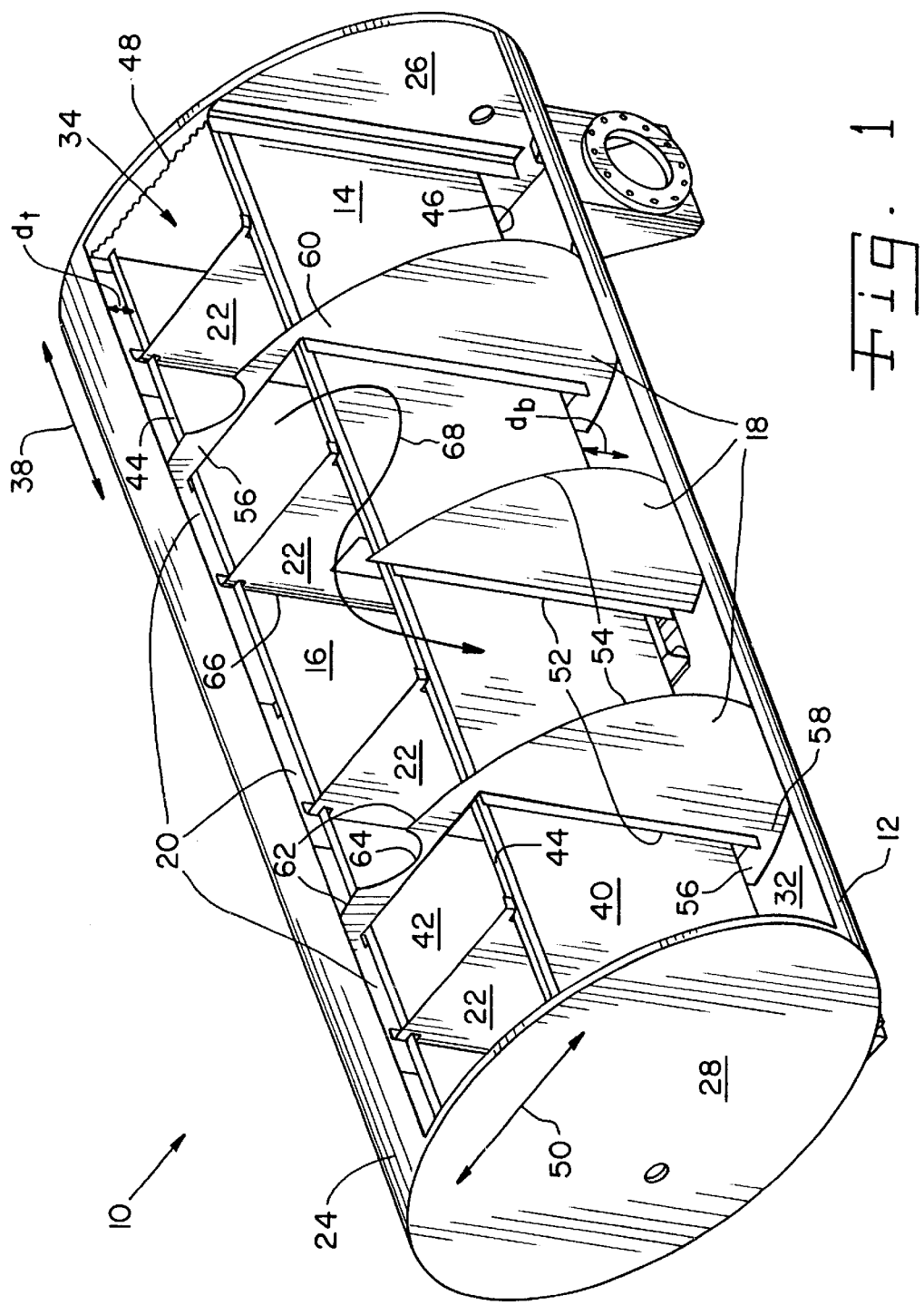
FIG. 1 is a cut away, perspective view of one embodiment of a water tank of the present invention.

Corresponding reference characters indicate corresponding parts throughout the several views. The exemplifications set out herein illustrates one preferred embodiment of the invention, in one form, and such exemplifications are not to be construed as limiting the scope of the invention in any manner.

DETAILED DESCRIPTION OF THE INVENTION

Referring now to the drawings, and particularly to FIG. 1, there is shown a water tank 10 including a shell 12, longitudinal baffles 14 and 16, first latitudinal baffles 18 and 20, and second latitudinal baffles 22.

Shell 12 is monolithically formed with an annular wall 24 interconnecting opposite longitudinal end walls 26 and 28. Annular wall 24 has an interior surface 32 which, along with end walls 26 and 28, defines an interior compartment 34 within shell 12. Shell 12 is formed of a polyester resin and has a spiraled filament 36 (FIG. 2) encased or embedded therein.

Each of longitudinal baffles 14 and 16 is disposed within interior compartment 34 of shell 12. Each longitudinal baffle 14 and 16 is oriented vertically and substantially parallel to a length direction (indicated by double arrow 38) of shell 12. Each longitudinal baffle 14 and 16 has a first side 40 facing annular wall 24. Each longitudinal baffle 16 and 18 also has a second side 42, with the two second sides 42 facing each other. Each of longitudinal baffles 14 and 16 has a top edge 44 and a bottom edge 46. Each of top edges 44 is separated from annular wall 24 by a distance $d_t$. Similarly, each bottom wall 46 is separated from annular wall 24 by a distance $d_b$. Top edges 44 are set at a vertical level which is lower than a top surface 48 of water contained in tank 10, for reasons which will be explained in more detail hereinafter.

Latitudinal baffles 18, 20 and 22 are disposed within interior compartment 34 of shell 12. Each of latitudinal baffles 18, 20 and 22 is oriented vertically and substantially parallel to a width direction (indicated by double arrow 50) of shell 12. First latitudinal baffles 18 and 20 are each disposed between a first side 40 of a longitudinal baffle 14, 16 and annular wall 24. Latitudinal baffles 18, 20 and 22 extend vertically higher than top edge 44 of longitudinal baffles 14 and 16, and also extend vertically lower than bottom edge 46 of longitudinal baffles 14 and 16. Each of first latitudinal baffles 18 and 20 includes a linear inner edge 52 which abuts a first side 40 of one of longitudinal baffles 14 and 16. Each first latitudinal baffle 18, 20 also has an elliptical edge 54 which conforms to and engages interior surface 32 of annular wall 24. Each of first latitudinal baffles 18 is aligned in width direction 50 with a corresponding first latitudinal baffle 20.

Planar bridges 56 interconnect bottom ends 58 of selected pairs of aligned first latitudinal baffles 18 and 20. Bridges 56 also interconnect top ends 60 of corresponding aligned first latitudinal baffles 18 and 20. Each bridge 56 includes two elliptical edges 62 which are separated by cutouts 64. Elliptical edges 54 of first latitudinal baffles 18, 20 and elliptical edges 62 of bridges 56 provide shell 12 with stability and structural strength. Each of elliptical edges 54 and 62 is chemically bonded to interior surface 32 of annular wall 24.

Second latitudinal baffles 22 are disposed between second sides 42 of longitudinal baffles 14, 16. Each second latitudinal baffle 22 has two linear outside edges 66 which abut respective second sides 42 of longitudinal baffles 14, 16. Second latitudinal baffles 22 are staggered relative to first latitudinal baffles 18, 20 along length direction 38 such that each first latitudinal baffle 18, 20 is equidistant from two adjacent second latitudinal baffles 22.

During use, tank 10 is attached to a truck (not shown) which transports tank 10 primarily in a direction substantially parallel to length direction 38. When the truck accelerates or decelerates, the inertia of the water within tank 10 causes the water to flow towards either end wall 26 or end wall 28. For example, if tank 10 is being transported in a direction generally to the left in FIG. 1 and the truck decelerates, such as when braking, the momentum of the water within tank 10 causes the water to flow towards end wall 28. As the water collides with a second latitudinal baffle 22, it takes the path of least resistance and flows over top edge 44 of longitudinal baffles 14 and 16, as indicated by arrow 68. Then, as the momentum of the water causes it to flow against and collide with one of first latitudinal baffles 18, 20, the water is forced to cross back over top edge 44 into the space between longitudinal baffles 14 and 16. As indicated by arrow 68, this back and forth or side to side motion of the water over top edges 44 continues along length direction 38. Thus, the baffling provides the water with a substantial latitudinal or side to side momentum which results in a dispersion and dampening of the surge forces of the water. As is readily apparent, the force of the water flowing over longitudinal baffle 14 towards longitudinal baffle 16 can be substantially canceled out by the force of the water flowing over longitudinal baffle 16 towards longitudinal baffle 14.

In addition to the side to side dispersion of the water flow, the water is also redirected in vertical directions after colliding with one of latitudinal baffles 18, 20 or 22. For example, after the water has collided with a first latitudinal baffle 18, it is redirected either upwardly to flow over top edge 44, or it is redirected downwardly to flow under bottom edge 46. Thus, the baffling system including baffles 14, 16, 18, 20 and 22 provides the flowing water with up and down as well as side to side components of motion.

The baffling system of the present invention effectively disperses the forces of the flowing water in different directions within tank 10. This dispersion of the water tends to cause the forces of the flowing water to cancel themselves out as they either collide with one another or impact a wall or baffle from opposite directions. For example, water flowing over top edge 44 of longitudinal baffle 14 towards longitudinal baffle 16 collides with water flowing over top edge 44 of longitudinal baffle 16 towards longitudinal baffle 14. The net effect of these collisions is that the kinetic energies of the opposing flows of water cancel each other out, resulting in a lessening or slowing of the overall flow of water. Even if the two flows of water do not completely collide with and block each other, the force of water flowing over top edge 44 of longitudinal baffle 14 and into second side 42 of longitudinal baffle 16 tends to be canceled out by the force of water flowing over top edge 44 of longitudinal baffle 16 and into second side 42 of longitudinal baffle 14.

Cutouts 64 of bridges 56 allow any gas, such as air, above surface 48 of the water to pass therethrough. This eliminates any vacuum pockets which may otherwise be formed at the top of interior compartment 34.

The vertical level of top edges 44 of longitudinal baffles 14, 16 have been described as being below surface 48 of the water. However, the baffling system of the present invention is also effective if surface 48 is somewhat below top edge 44. As the water flows within and relative to tank 10 when tank 10 accelerates or decelerates, top surface 48 forms waves or crests whose vertical levels are higher than that of top edge 44. Also, as the water collides with one of latitudinal baffles 18, 20 and 22, its momentum and/or kinetic energy may be sufficient to carry it over top edge 44 in opposition to the force of gravity. Moreover, at substantially any vertical level of top surface 48, latitudinal baffles 18, 20 and 22 cause the water to swirl back and forth and side to side across bottom edge 46 of longitudinal baffles 14, 16, thereby dispersing the forces associated with the surging water.

Figure 2:
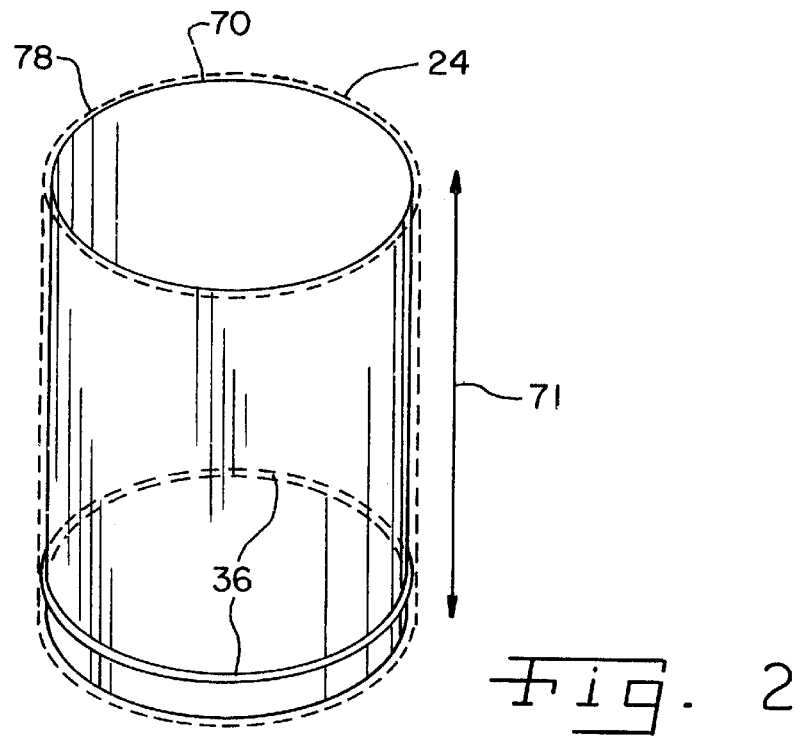
FIG. 2 is a perspective view of a cylindrical shell used in manufacturing the water tank of FIG. 1.

During manufacturing, annular wall 24 (shown in dotted line in FIG. 2) of shell 12 is formed by winding filament 36 off of a reel (not shown) around a circular mandrel 70 (shown in solid line in FIG. 2). The filament 36 is coated in a polyester resin. Only one turn of filament 36 is shown. However, filament 36 is wound in a spiral fashion along the entire length 71 of circular mandrel 70. As the resin cures, filament 36 holds the shape of mandrel 70. Mandrel 70 provides annular wall 24 with a substantially circular cross section.

Figure 3:
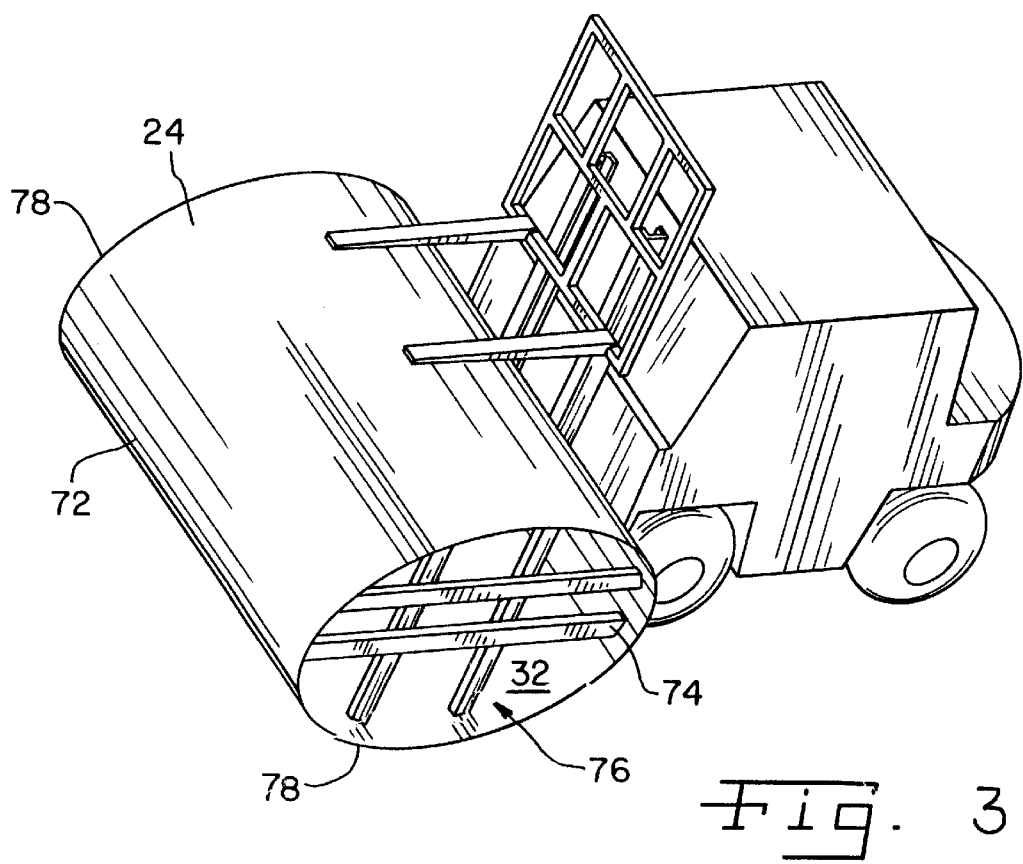
FIG. 3 is a perspective view of the cylindrical tank of FIG. 2 being pressed into an elliptical shape.
Figure 4:
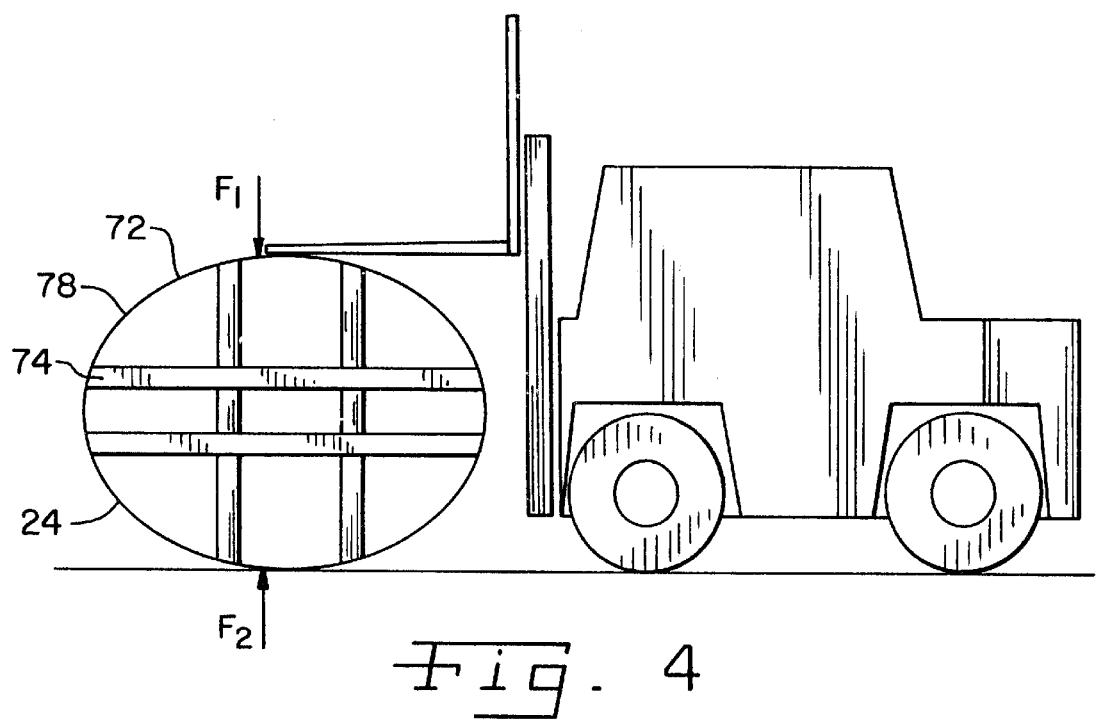
FIG. 4 is a side view of the cylindrical shell of FIG. 2 being pressed into an elliptical shape.
Figure 5:
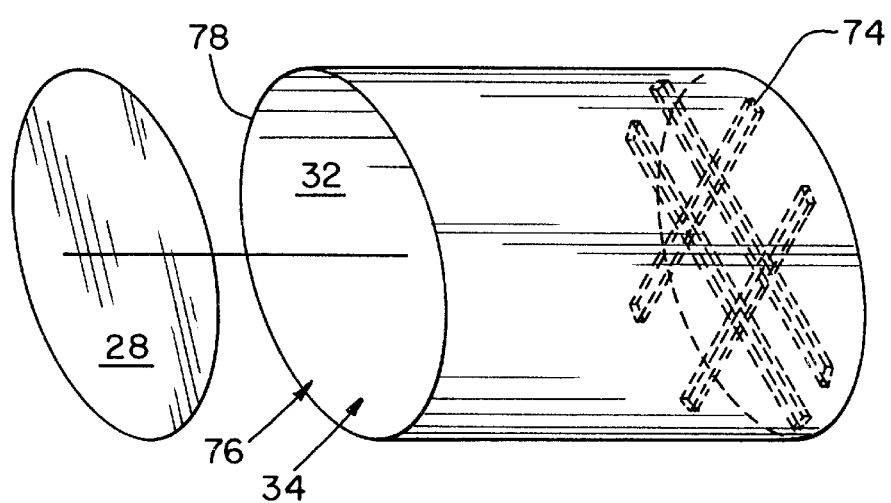
FIG. 5 is a perspective view of the elliptical shell of FIGS. 3 and 4.

After annular wall 24 is removed from mandrel 70, two oppositely directed inward forces $F_1$ and $F_2$ (FIG. 4) are exerted on exterior surface 72 of annular wall 24 until the cross section of annular wall 24 becomes substantially elliptical or oval shaped. In the embodiment show in FIGS. 3 and 4, forces $F_1$ and $F_2$ are shown as being exerted by the tines of a forklift and a floor surface, respectively. However, it can be readily understood that forces $F_1$ and $F_2$ can also be supplied by a variety of other sources. The locations on exterior surface 72 upon which forces $F_1$ and $F_2$ are exerted are displaced approximately 180° from one another along exterior surface 72.

While the tines of the forklift are still holding annular wall 24 in its elliptical shape, a wooden jig 74 is inserted into an interior space 76 surrounded by annular wall 24. Wooden jig 74 serves as a brace and maintains the elliptical cross section of annular wall 24 while it is curing. Although only one wooden jig 74 is shown, it is also possible to place several wooden jigs along length direction 38 of annular wall 24. Further, it is possible to use other types of brace structures to hold the elliptical cross section of annular wall 24. For example, annular wall 24 may be placed into a metal elliptical ring or cylinder which engages and exerts a retaining force on exterior surface 72, thereby maintaining the elliptical cross section of annular wall 24.

At this point, first longitudinal end wall 28 is chemically bonded onto its respective open end 78 of annular wall 24. Then, first latitudinal baffles 18, 20 and bridges 56 are inserted into interior space 76. Elliptical edges 54 and 62 of first latitudinal baffles 18, 20 and bridges 56, respectively, are chemically bonded to interior surface 32 of annular wall 24. Since elliptical edges 54 and 62 support annular wall 24 and maintain its elliptical cross section, wooden jig 74 may be removed.

Longitudinal baffles 14, 16 and second latitudinal baffles 22 are then inserted into interior space 76 between first latitudinal baffles 18 and 20. Next, longitudinal end wall 26 is chemically bonded onto its respective open end 78 of annular wall 24 in order to form a monolithic and substantially seamless shell 12.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A tank for containing a liquid while being transported by a moving vehicle, said tank comprising:
    a shell having an annular wall interconnecting opposite longitudinal end walls, said annular wall and said end walls defining an interior compartment, said shell also having a substantially horizontal length direction and a substantially horizontal width direction perpendicular to said length direction;
    two substantially planar longitudinal baffles disposed within said interior compartment of said shell, each said longitudinal baffle being oriented substantially vertically and substantially parallel to said length direction of said shell, each said longitudinal baffle having a first side facing said annular wall, each said longitudinal baffle also having a second side, said second sides facing each other; and
    a plurality of substantially planar latitudinal baffles disposed within said interior compartment of said shell, each said latitudinal baffle being oriented substantially vertically and substantially parallel to said width direction of said shell, first ones of said latitudinal baffles each being disposed between said first side of a corresponding said longitudinal baffle and said annular wall, second ones of said latitudinal baffles being disposed between said second sides of said two longitudinal baffles, said second latitudinal baffles being substantially staggered relative to said first latitudinal baffles along said length direction of said shell.

2. The tank of claim 1, wherein at least one said first latitudinal baffle disposed on said first side of one said longitudinal baffle is aligned in said width direction with a corresponding said first latitudinal baffle disposed on said first side of an other said longitudinal baffle, said tank further comprising a substantially planar bridge interconnecting one of corresponding bottom ends of said aligned first latitudinal baffles and corresponding top ends of said aligned first latitudinal baffles.

3. The tank of claim 2, wherein said bridge has two elliptical edges conforming to and engaging said annular wall, and a cutout interconnecting said two elliptical edges, said cutout configured for allowing a gas to pass therethrough.

4. A tank for containing a liquid while being carried by a motor vehicle, said tank comprising:
    a shell having a substantially horizontal length direction, a substantially horizontal width direction perpendicular to said length direction, and an interior compartment;
    at least one substantially planar longitudinal baffle disposed within said interior compartment of said shell, each said longitudinal baffle being oriented substantially vertically and substantially parallel to said length direction of said shell, each said longitudinal baffle having a first side and a second side; and
    a plurality of substantially planar latitudinal baffles disposed within said interior compartment of said shell, each said latitudinal baffle being oriented substantially vertically and substantially parallel to said width direction of said shell, first ones of said latitudinal baffles being disposed on said first side of a selected said longitudinal baffle, second ones of said latitudinal baffles being disposed on said second side of said selected longitudinal baffle, said second latitudinal baffles being substantially staggered relative to said first latitudinal baffles along said length direction of said shell.

5. The tank of claim 4, wherein said shell has an annular wall interconnecting opposite longitudinal end walls, each said longitudinal baffle having a top edge and a bottom edge, at least one of said top edge and said bottom edge being separated from said annular wall by a predetermined distance, said latitudinal baffles extending at least one of vertically higher than said top edge and vertically lower than said bottom edge.

6. The tank of claim 5, wherein said top edge of each said longitudinal baffle is configured for being below a top surface of the liquid.

7. The tank of claim 4, wherein said tank is configured for being transported by the motor vehicle in a direction substantially parallel to said length direction.

8. The tank of claim 7, wherein said at least one longitudinal baffle and said latitudinal baffles conjunctively define a means for causing the liquid to swirl between said first side and said second side of said selected longitudinal baffle when said tank is accelerated by the motor vehicle in said direction substantially parallel to said length direction.

9. The tank of claim 4, wherein said first latitudinal baffles abut said first side of said selected longitudinal baffle, and said second latitudinal baffles abut said second side of said selected longitudinal baffle.

10. The tank of claim 4, wherein said first latitudinal baffles are substantially equidistant from adjacent ones of said second latitudinal baffles.

11. The tank of claim 4, wherein said annular wall includes an interior surface, at least one first latitudinal baffle having an elliptical edge conforming to and engaging said interior surface of said annular wall.

12. A tank for containing a liquid while being transported by a moving vehicle, said tank comprising:
   two opposite end walls; and
   an annular wall interconnecting said opposite end walls and a plurality of turns of wound filament;
   wherein said annular wall and said end walls define an interior compartment, said tank further comprising:
      at least one longitudinal baffle disposed within said interior compartment, each said longitudinal baffle having a first side and a second side; and
      a plurality of latitudinal baffles disposed within said interior compartment, first ones of said latitudinal baffles being disposed on said first side of a selected said longitudinal baffle, second ones of said latitudinal baffles being disposed on said second side of said selected longitudinal baffle, said second latitudinal baffles being substantially staggered relative to said first latitudinal baffles along said selected longitudinal baffle.

13. The tank of claim 12, wherein said turns of wound filament are substantially concentric with said opposite end walls.

14. The tank of claim 12, wherein said turns of wound filament are encased in a polyester resin.

* * * * *